(12) United States Patent
Strothmann

(10) Patent No.: US 7,984,922 B2
(45) Date of Patent: Jul. 26, 2011

(54) CARRIER FRAME FOR A MANUALLY MOVABLE CADDIE, IN PARTICULAR A GOLF CADDIE

(76) Inventor: Rolf Strothmann, Saarbrücken (DE)

( * ) Notice: Subject to any disclaimer, the term of this patent is extended or adjusted under 35 U.S.C. 154(b) by 417 days.

(21) Appl. No.: 11/660,175

(22) PCT Filed: Aug. 12, 2005

(86) PCT No.: PCT/EP2005/008785
§ 371 (c)(1),
(2), (4) Date: Feb. 14, 2007

(87) PCT Pub. No.: WO2006/021331
PCT Pub. Date: Mar. 2, 2006

(65) Prior Publication Data
US 2007/0284854 A1    Dec. 13, 2007

(30) Foreign Application Priority Data
Aug. 23, 2004 (DE) .......................... 10 2004 040 855

(51) Int. Cl.
*B62B 1/10* (2006.01)
(52) U.S. Cl. ................... 280/646; 280/43.16; 280/47.19
(58) Field of Classification Search .............. 280/646, 280/47.19, 43.15, 43.16
See application file for complete search history.

(56) References Cited

U.S. PATENT DOCUMENTS

| | | | |
|---|---|---|---|
| 2,470,272 A | 5/1949 | Trimmer | |
| 2,577,290 A * | 12/1951 | Underwood | 280/646 |
| 2,598,046 A | 5/1952 | Frey | |
| 2,648,545 A | 8/1953 | Cassidy | |
| 2,673,589 A * | 3/1954 | Bert | 280/47.19 |
| 3,222,100 A * | 12/1965 | Lindzy | 296/20 |
| 4,583,758 A * | 4/1986 | Runion et al. | 280/644 |
| 5,267,750 A * | 12/1993 | Thompson | 280/646 |
| 5,330,212 A * | 7/1994 | Gardner | 280/40 |
| 5,351,983 A | 10/1994 | Descalo et al. | |
| 5,673,928 A | 10/1997 | Jury et al. | |
| 5,829,585 A * | 11/1998 | Kao et al. | 206/315.3 |
| 5,868,247 A * | 2/1999 | Schrader | 206/315.4 |
| 5,887,879 A * | 3/1999 | Chumley | 280/40 |
| 6,186,522 B1 * | 2/2001 | Weis | 280/37 |
| 6,375,200 B1 * | 4/2002 | Harter | 280/30 |
| 6,402,186 B1 * | 6/2002 | Garland | 280/647 |
| 7,303,197 B1 * | 12/2007 | Searle | 280/47.26 |
| 2002/0185844 A1 | 12/2002 | Gregory | |

FOREIGN PATENT DOCUMENTS

FR    2 575 430    7/1986

* cited by examiner

Primary Examiner — Hau V Phan
Assistant Examiner — Bridget Avery
(74) Attorney, Agent, or Firm — Lucas & Mercanti, LLP; Klaus P. Stoffel

(57) ABSTRACT

The invention relates to a carrier frame for a manually movable caddie, in particular to a golf caddie comprising wheels (2) mounted on the laterally protruding parts (7, 8) of the fame. According to the invention, for folding the golf caddie, the laterally protruding parts (7, 8) of the frame are embodied pivotable and/or displaceable in such a way that they bring the wheels (2) closer to each other towards a mid-plane (18) or move them away therefrom. In a preferred embodiment, the protruding parts (7, 8) of the frame and the wheels (2) are embodied pivotable or displaceable in such a way that the axes of the brought together wheels (2) coincide and the wheels (2) are disposed oppositely to each other by the external faces thereof.

7 Claims, 4 Drawing Sheets

CARRIER FRAME FOR A MANUALLY MOVABLE CADDIE, IN PARTICULAR A GOLF CADDIE

The invention concerns a support frame for a hand cart, especially a golf bag cart, with wheels mounted on laterally projecting parts of the support frame.

Golf carts with a support frame of this type, which usually have two wheels, are well known. Holders for mounting a golf bag between the wheels and a push/pull rod are mounted on the support frame.

The objective of the invention is to create a new golf bag cart support frame, by which the handling and various possible manners of use of the golf bag cart are improved.

The golf bag cart of the invention that achieves this objective is characterized by the fact that the laterally projecting parts of the support frame can be rotated and/or displaced in such a way that the wheels move towards or away from a center plane.

Advantageously, a golf bag cart of this type can be folded into a body with a flat contour for the purpose of transporting it. The folded golf bag cart requires little stowage room and can be stowed away, e.g., in the trunk of a car, alongside other bags or luggage.

While it would be possible to fold the laterally projecting parts, e.g., supports extending transversely to a center rod of the support frame, in the same direction of rotation in such a way that the wheels move close to the support rod, in a preferred embodiment of the invention, the support frame parts can be rotated or displaced in such a way that the wheels are brought close to each other.

Advantageously, in addition to the support parts, the wheels can be rotated about an axis that is at an angle to the axis of the wheel, so that the wheels, which have been moved close to each other, are axially aligned with each other. In this case, the golf bag cart can still be moved even in its folded state.

The outer sides of the axially aligned wheels face each other. In this embodiment, the wheels can be arranged in a way that is especially space-saving.

The support frame advantageously has a frame-like structure in a top view with room for a downwardly bulging golf bag. This has the advantage that the overall height of the loaded golf bag cart is reduced and thus the position of the center of gravity is improved. It is obvious that a support frame of this description is advantageous even if the golf bag cart cannot be folded in accordance with the invention.

In another embodiment of the invention, the laterally projecting parts of the support frame are formed as yokes with two yoke legs articulated on the rest of the support frame, e.g., a center rod. The yoke legs preferably extend obliquely downward from the articulations to the wheels, which increases the free space for the golf bag between the wheels.

In an especially preferred embodiment of the invention, the yoke legs are articulated on crossmembers that support the two ends of holders for a golf bag. While it is conceivable for these crossmembers to be joined by the aforementioned center rod, the support frame preferably consists solely of the crossmembers and frame yokes and in this way forms the aforementioned frame-like support frame in an advantageous way.

In a further refinement of the invention, the yoke legs can be rotated towards each other about a joint located close to the wheel axes. This provides the possibility of further folding the cart beyond the state described above by swinging the yoke legs towards each other.

The joints necessary for rotating the support frame parts and the wheels can be locked both in the operating position of the support frame parts and wheels and in the rotated position, in which the golf bag cart is folded together. This makes it possible for the folded golf bag cart to be safely handled and possibly even moved on its wheels.

The invention is explained in greater detail below with reference to the specific embodiments illustrated in the accompanying drawings.

FIG. 4 shows a side view of the golf bag cart folded as shown in FIG. 3 with the push/pull rod rotated in.

FIG. 8 shows a side view of the golf bag cart folded as shown in FIG. 3 with the push/pull rod rotated around and the frame yoke legs rotated in.

Figure 1:
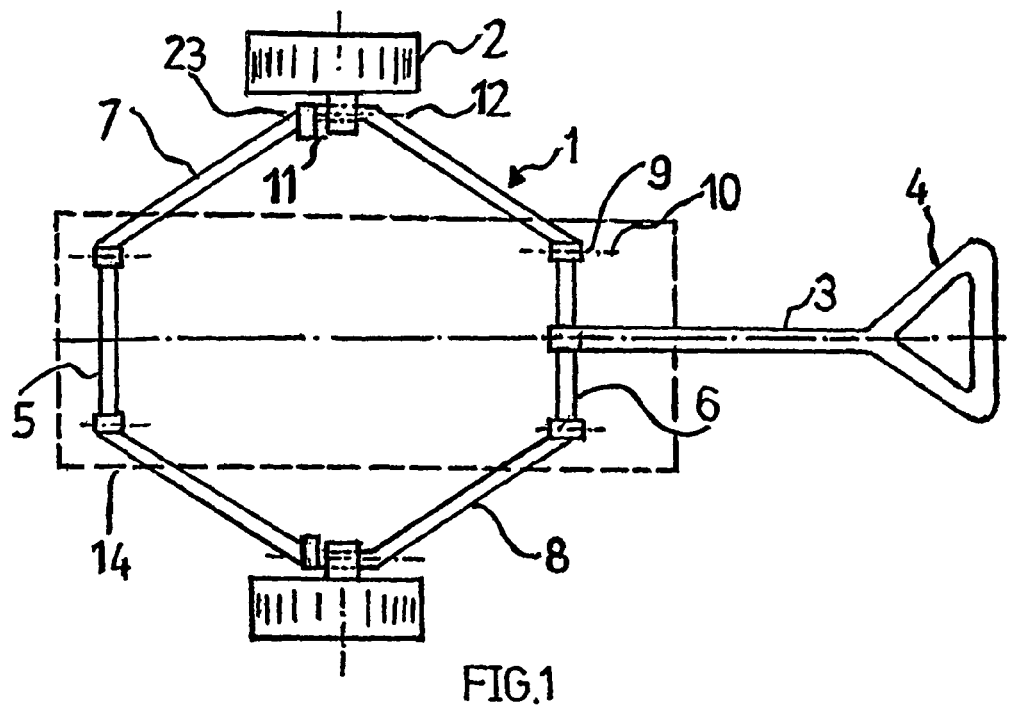
FIG. 1 shows a top view of a golf bag cart of the invention.

A golf bag cart has a support frame 1, on which wheels 2 that lie opposite each other and a push/pull rod 3 with a handle 4 are mounted.

The support frame 1 consists of a front crossmember 5 and a rear crossmember 6 (front and rear with respect to the pushing direction) and frame yokes 7 and 8, which articulate with the crossmembers and on which the wheels 2 are mounted.

Four joints 9 with a joint axis 10 join the crossmembers 5, 6 and frame yokes 7, 8. During normal operation of the golf bag cart, the joints 9 are locked, so that the frame yokes and crossmembers form a stable frame.

Each of the wheels 2 is joined with the corresponding frame yoke 7 or 8 by a lockable joint 11 that can be rotated about an axis 12. In the embodiment illustrated here, the joint axes 10 of the joints 9 extend parallel to the joint axes 12 of the joints 11.

The yoke frames 7 and 8 each have two yoke legs 21 and 22. A hinge 23, whose axis of rotation 24 lies in the plane fixed by the yoke legs 21, 22, is provided near each joint 11 in the two yoke legs 21 located in front with respect to the pushing direction.

A holder 13 or 14 (not shown in FIGS. 1 and 3) for a golf bag 15 is provided on each crossmember 5 or 6. The holder and golf bag can have suitable fastening devices for each other. The holders 13, 14 can be folded over by at least 90°.

The push/pull rod 3 is joined with the crossmember 6 by a lockable joint 25.

The golf bag cart described above is equipped with an auxiliary drive (not shown) with drive motors housed in the wheels. The auxiliary drive is automatically controlled by a force sensor in the handle 4 and a control device in such a way that, regardless of the given load conditions, the user must apply only an amount of pulling or pushing force that is felt as comfortable. The holder 14 contains a compartment 16 for a battery as the power source of the auxiliary drive, and the control circuit that automatically controls the auxiliary drive is integrated in the battery compartment.

Figure 2:
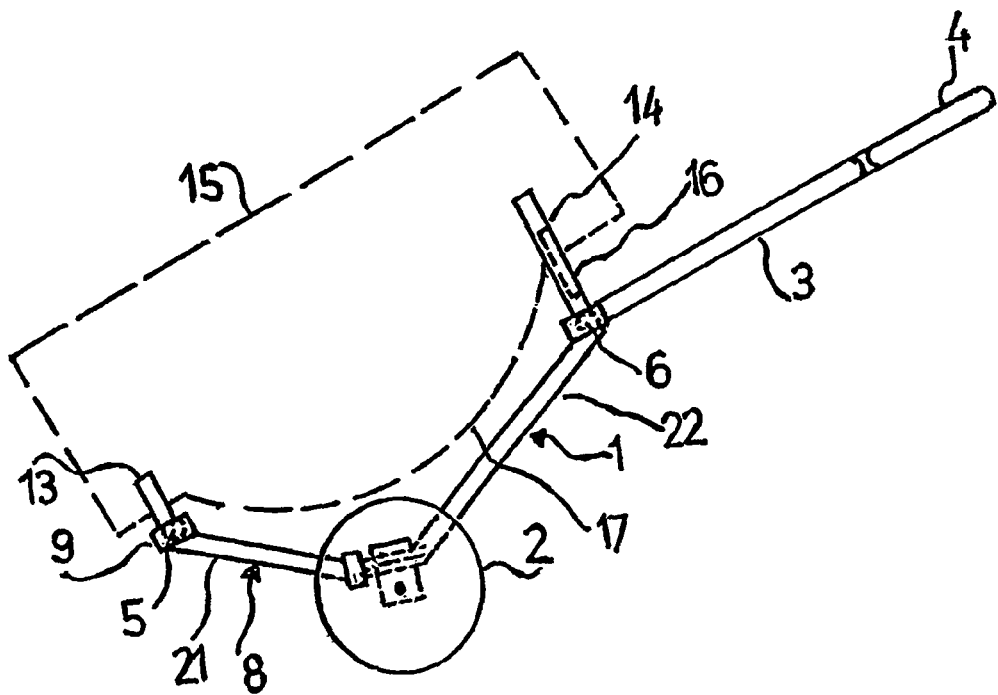
FIG. 2 shows a side view of the golf bag cart of FIG. 1.

As FIG. 2 shows, the legs 21 and 22 of the frame yokes 7 and 8 extend obliquely downward from the joints 9 to the wheels. The open frame provides space between the wheels for a downwardly bulging part 17 of the golf bag 15.

Figure 3:
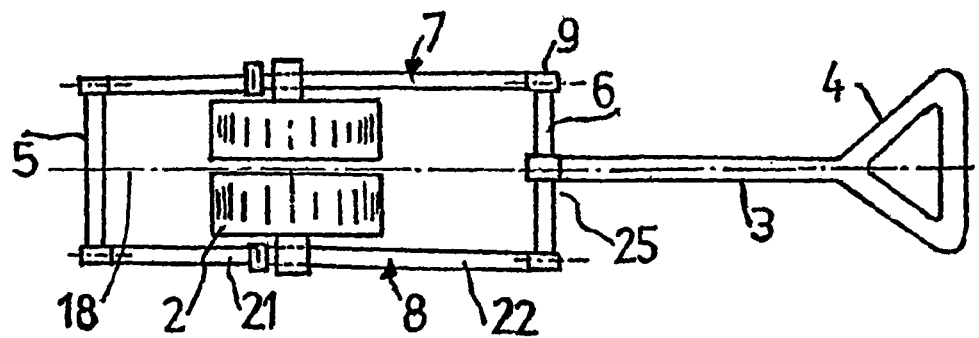
FIG. 3 shows a top view of the golf bag cart of FIG. 1 in its folded state.

As shown in FIG. 3, the golf bag cart can be folded up for transport. This is done by releasing the joints 9 and 11 and rotating the frame yokes 7 and 8 towards a center plane 18 in opposite directions of rotation. The wheels 2 were previously rotated about the axes 12 sufficiently far that they are axially aligned with each other in the position of the frame yokes 7 and 8 shown in FIG. 3 and their outer sides face each other.

In the position shown in FIG. 3, the joints 9 and 11 can be locked again, so that the golf bag cart is stable even in its folded state, can be rolled on its wheels 2, and can be pushed or pulled with assistance by the auxiliary drive, with the golf bag possibly remaining on the folded cart.

In the position shown in FIG. 3, the cart is flat in its contour and requires little stowage room. For example, it can be stowed away in a narrow space left above the luggage in the trunk of a car.

Figure 4:
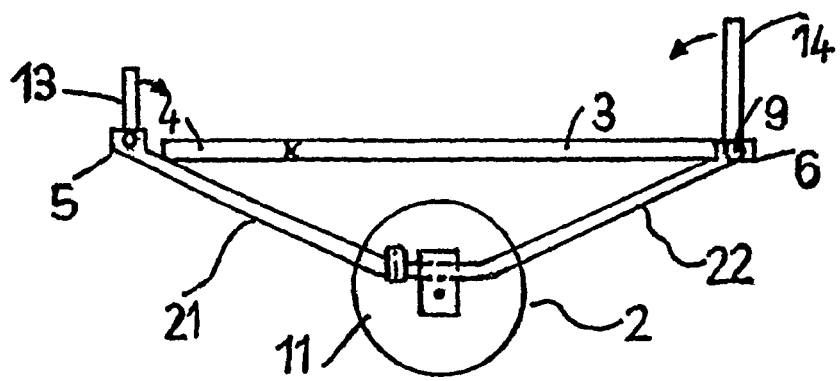

As shown in FIG. 4, the push/pull rod 3 can be folded in by rotating it about the joint 25, so that the length of the folded golf bag cart can be still further significantly reduced.

Figure 5:
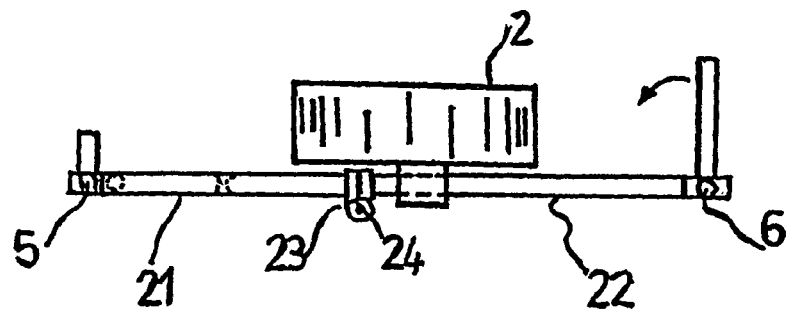
FIG. 5 shows the golf bag cart of FIG. 1 folded in a different way from FIGS. 3 and 4.

As an alternative to the above manner of collapsing the golf bag cart, the cart can be converted to the state shown in FIG. 5, in which the wheel axes extend parallel to each other, by rotating the frame yokes 7, 8 to the outside, so that the yoke legs 21, 22 lie in a plane with the crossmembers 5, 6, and by rotating the wheel 2 by 90°.

As a result of the rotation of the frame yokes, the axes of rotation 24 of the hinges 23 also lie in the specified plane. Consequently, as shown in FIG. 6, the two yoke legs 21, together with the crossmember 5, can be rotated by 180°.

Figure 6:
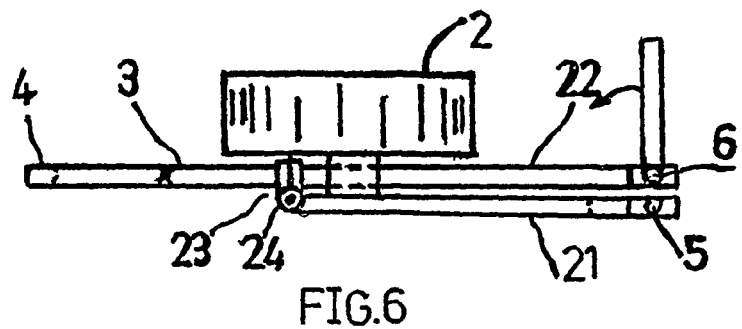
FIG. 6 shows the golf bag cart of FIG. 1 in a state that is further folded relative to FIG. 5.

The push/pull rod 3 and handle 4, which are seen in FIG. 6, could be provided with a telescoping design or with an additional joint, so that the push/pull rod can be housed inside the contours of the folded golf bag cart.

A clamping bolt passed lengthwise through each crossmember 5 and 6 can be used for the simultaneous locking of two joints 9.

In addition, the joints can have locking seats, into which they are pressed in the operating state of the cart by its own weight and/or the load that it is carrying.

Figure 8:
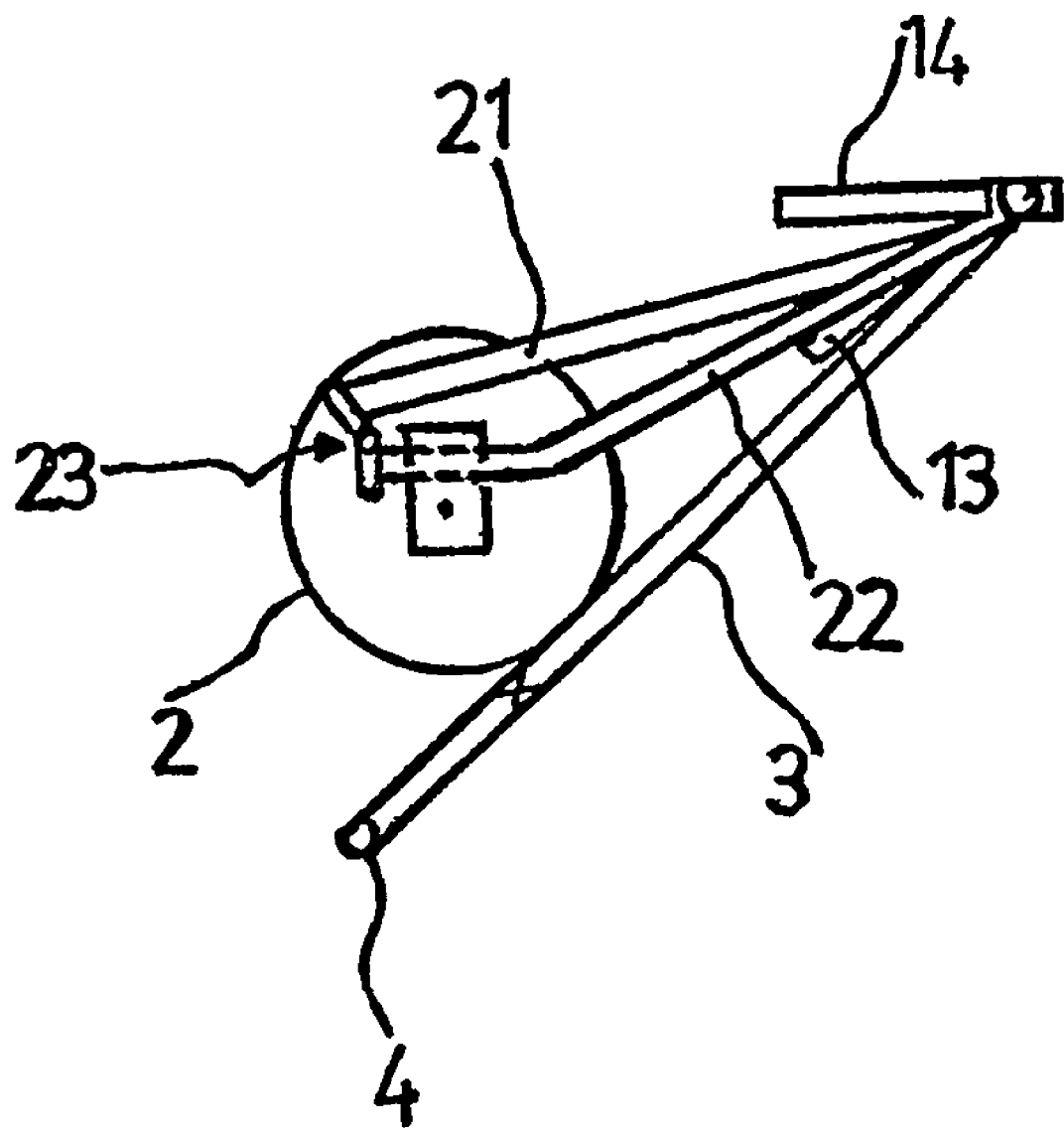

Alternatively or additionally, the joints 23 can be designed in such a way that the two yoke legs 21 can be rotated about an axis parallel to the wheel axes out of the position shown in FIG. 3 and towards the yoke legs 22. The rotation can possibly be made about the wheel axis itself. This can bring the golf bag cart into the position shown in FIG. 8.

Furthermore, it would be possible to design the joints 23 in such a way that the yoke legs 21 can be folded towards the yoke legs 22 even in the operating position of the golf bag cart.

It is thus possible to fold up the golf bag cart in different ways, depending on the space conditions. The alternative shown in FIGS. 5 and 6 leads to an overall flatter contour, but this is achieved at the expense of a greater width of the folded golf bag cart. When the golf bag cart is folded into the state shown in FIG. 5, it has the disadvantage, compared to the state shown in FIG. 3, that it is no longer possible to move it on its wheels.

Figure 7:
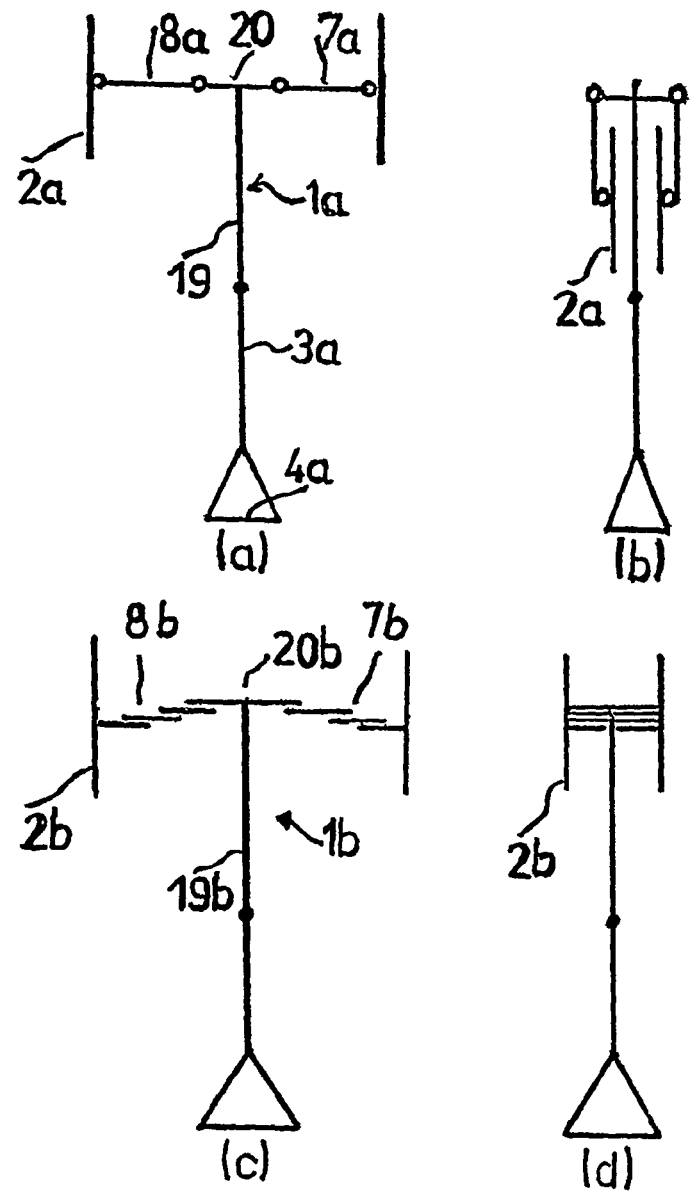
FIG. 7 shows schematic drawings of further embodiments of a golf bag cart of the invention.

In the alternative embodiment shown in FIGS. 7a and 7b, a support frame 1a has a center rod 19 and a crossmember 20 with rotating end sections 7a and 8a, and rotating wheels 2a are in turn mounted on the end sections. As FIG. 4b shows, the end sections can be rotated towards the center rod 19, and the wheels 2a can be rotated in such a way that their outer sides face each other. The wheels could be rotated in opposite directions, as is also the case, incidentally, with the embodiment of FIGS. 1 to 3, and then the end sections 7a and 8a can be swung in closer to the center rod 19.

Another embodiment shown in FIGS. 7c and 7d has a support frame 1b with a center rod 19 and a crossmember 20b, and arms 7b and 8b of the crossmember 20b can be telescoped together to reduce the distance separating the opposing wheels 2b.

The invention claimed is:

1. A support frame for a hand cart with two wheels (2) each mounted on a respective one of two laterally projecting parts (7, 8) of the support frame (1), wherein the laterally projecting parts (7, 8) of the support frame can be rotated or displaced in opposite directions in such a way that the wheels (2) move towards or away from a center plane (18), wherein after the wheels (2) have been brought close together, their outer sides face each other, wherein the laterally projecting parts (7, 8) of the support frame are formed as yokes with two yoke legs (21, 22), wherein each of the two yoke legs (21, 22) of each yoke is articulated on one end of a respective one of two crossmembers (5, 6) that support the ends of holders (13, 14) for a golf bag (15, 17), and wherein the support frame (1) is formed as a closed loop and consists solely of the crossmembers (5, 6) and the two yokes (7, 8).

2. A support frame in accordance with claim 1, wherein, in addition to the laterally projecting parts (7, 8), the wheels (2) can be rotated about an axis (12) that is at an angle to the axis of the wheels.

3. A support frame in accordance with claim 1, wherein in a top view, the support frame (1) has a frame-like structure with room for downwardly bulging baggage.

4. A support frame in accordance with claim 1, wherein the yoke legs (21, 22) extend obliquely downward from a point where the yoke legs are articulated on the crossmembers toward the wheels (2).

5. Support frame in accordance with claim 1, wherein the yoke legs (21, 22) can be rotated towards each other about a joint (23).

6. A support frame in accordance with claim 2, wherein the laterally projecting parts (7, 8) and the wheels (2) can be rotated or displaced in such a way that the axes of the wheels (2) coincide after the wheels (2) have been brought close together.

7. A support frame in accordance with claim 2, wherein joints necessary for rotating the laterally projecting parts (7, 8) and the wheels (2) can be locked both in an operating position of the laterally projecting parts (7, 8) and wheels (2) and in a rotated, non-operating position.

* * * * *